Jan. 31, 1961  F. L. GRANT  2,969,768
ANIMAL EXERCISER AND TRAINER
Filed Nov. 17, 1958
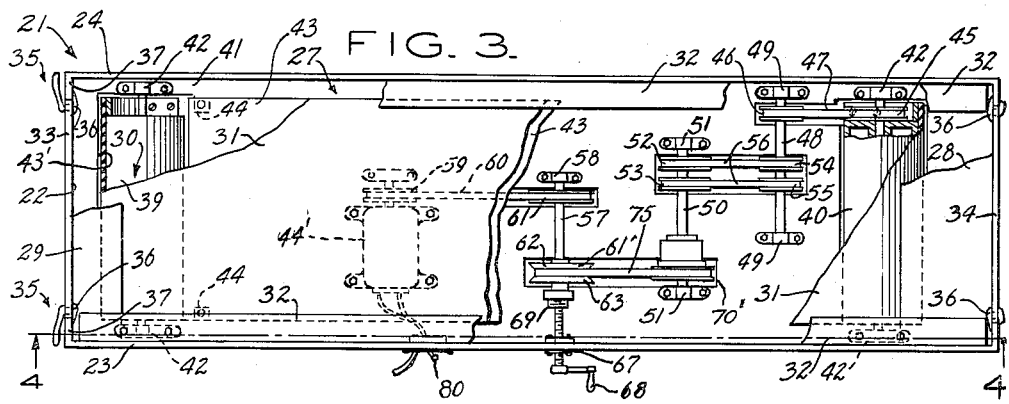
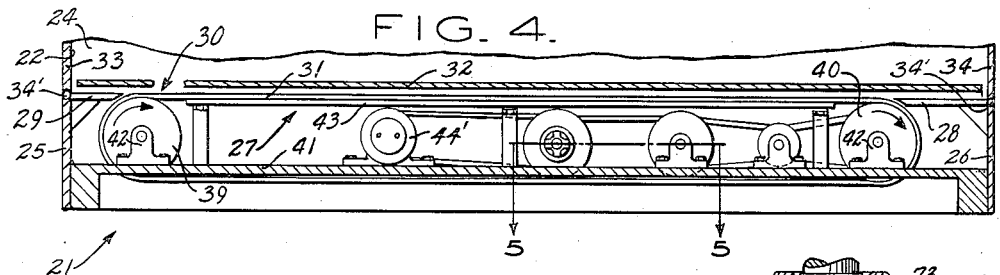
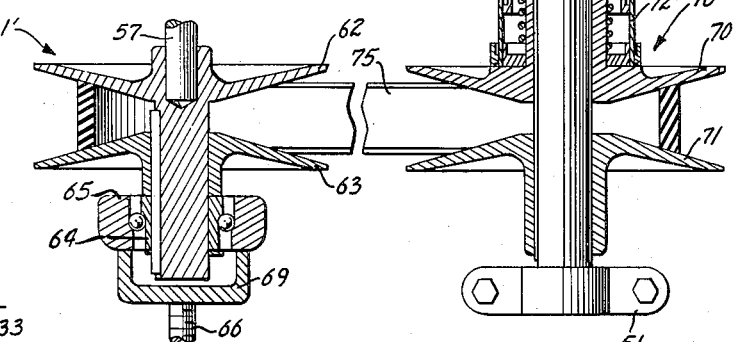
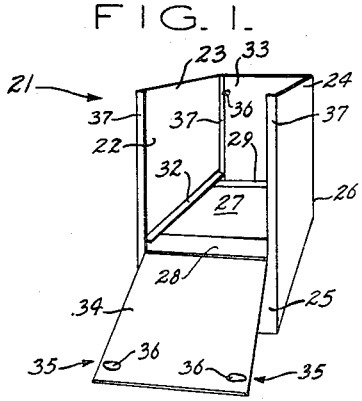
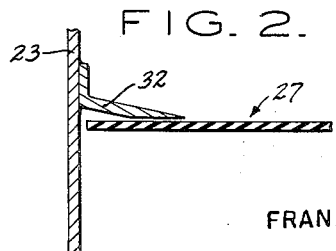
INVENTOR.
FRANK L. GRANT
BY
ATTORNEYS United States Patent Office 2,969,768
Patented Jan. 31, 1961

2,969,768
ANIMAL EXERCISER AND TRAINER
Frank L. Grant, 27851 Santa Barbara Drive,
Lathrup Village, Mich.
Filed Nov. 17, 1958, Ser. No. 774,346
5 Claims. (Cl. 119—29)

This invention pertains to an animal exerciser, and more particularly, to an exerciser adapted for use in confined spaces and having a wide operational range to move an exercising surface from standstill to a desired surface speed for the proper exercising and training of animals.

This invention provides a variably driven exercising surface in a walled enclosure which is provided with side and end safety ledges and which has an entrance and exit ramp. The ramps are formed by pivoting the front and rear walls downwardly until they make ground contact. The exercising surface is an endless belt and is driven for longitudinal movement in the enclosure.

The side walls of the enclosure are provided with overlapping safety ledges for preventing animal injury due to a wedging between the belt and the wall. A safety platform is provided at the rear of and coplanar with the endless belt so that failure of the animal to maintain the belt speed will result in his hind legs being lodged on the safety platform rather than being turned under with the belt. A front safety platform is also provided to protect the feet of the animal.

It is therefore an object of this invention to provide an animal exerciser in a confined space which has an exercising surface movable through a manual control from a standstill to any desired speed.

It is a further object to provide an animal exerciser including a driven exercising surface in a walled enclosure with safety ledges overlapping the surface sides and with safety platforms at the ends of the enclosure to prevent animal injury.

It is a further object to provide such an exerciser which has entrance and exit ramps which are formed by pivoting the rear and front walls downwardly until they make ground contact.

These and other objects and advantages will become more apparent when a preferred embodiment of this invention is considered in connection with the drawings, in which:

Figure 1 is a perspective view of the exerciser having its rear wall pivoted downwardly to form an entrance ramp.

Figure 2 is an enlarged section showing an overlapping side safety ledge.

Figure 3 is a slightly enlarged plan view of the exerciser with portions removed, showing the mechanism for variably driving the endless belt.

Figure 4 is a slightly enlarged section showing the variable drive in elevation, taken on line 4—4, Fig. 3.

Figure 5 is a further enlarged section taken at 5—5, Figure 4, showing a detail of the variable drive.

Referring now more particularly to the drawings, the animal trainer and exerciser is indicated generally at 21 and comprises an elongated enclosure 22 having laterally spaced parallel upright side walls 23 and 24 connected at their ends by front and rear parallel upright end walls 25 and 26. A floor 27 is provided within the enclosure spaced above the bottom of the enclosure for a purpose more fully described hereinafter. The floor comprises the safety panels or platforms 28 and 29 respectively positioned at the ends of the enclosure and rigidly secured to the side and end walls thereof. A variably driven endless flexible linear member or belt 30 extends between the safety platforms. The top run 31 of the belt and the safety platforms are disposed in a common horizontal plane and define the floor 27. The platforms 28 and 29 are large enough to support the feet of an animal using the exerciser and the space between the edges of the platforms and the top run of the belt is so small that the feet of the animal cannot possibly be turned under by the belt. The width of the belt is somewhat less than the width of the enclosure. To prevent animal injury due to the wedging of a foot between the belt and a side wall, a longitudinally extending horizontal safety ledge 32 is attached to the inner side of each side wall in overlapping relation to the corresponding edge of the belt and extends from end to end of the enclosure.

The front and rear end walls 25 and 26 of the enclosure have upper portions or doors 33 and 34 respectively which are hinged at their lower edges for swinging movement from a normal upright position completing the enclosure downwardly and outwardly about horizontal axes 34' located at floor level. The rear door 34 is shown in Figure 1 in the down position contacting the ground to enable an animal to be led into the enclosure. The animal may be led from the enclosure by swinging the front door 33 downwardly into ground contact. Releasable latches 35 are carried by each door having latching portions 36 engageable behind the fixed flanges 37 at each end of the side walls to hold the panels in upright position. The latch portions 36 are rotatable to positions clearing the flanges by the handle portions of the latches on the outer side of the door.

The means for driving the belt in a clockwise direction as viewed in Figure 4, are confined within the walls of the enclosure beneath the floor and completely out of sight.

As shown in Figures 3–5, the front and rear ends of the belt are reeved over the horizontal transversely extending drums 39 and 40. The drums are supported for rotation about parellel axes on a base 41 within the enclosure by the bearing blocks 42. The drums are spaced apart far enough to maintain the belt taut, and the top run of the belt constituting a floor portion is supported against sagging by a flat rectangular panel 43 extending between the drums and having a sufficient width to support the belt. The support panel 43 is rigidly mounted upon the base 41 by braces 44. The base is recessed at 43' to accommodate the drums and to allow the lower run of the belt to pass through the hollow underside of the base.

The rear drum 40 is driven in a clockwise direction by a constant speed electric motor 44' mounted on the base. The drum has a pulley 45 rigid therewith driven by a pulley 46 and belt 47 connecting the pulleys. The pulley 46 is rigidly supported on a transverse shaft 48 journaled on the base by bearing blocks 49. Another transverse shaft 50 is journaled on the base by bearing blocks 51 and has the pair of pulleys 52, 53 rigidly mounted thereon and respectively connected to the pulleys 54, 55 fixed on the shaft 48 by belts 56. The shaft 50 is driven by a transverse shaft 57 journaled on the base in bearing blocks 58, the latter shaft in turn being driven by the motor, being connected to the motor pulley 59 by belt 60 extending over the pulley 61 on shaft 57.

In order to provide a variable speed drive, the shaft 57 has a pulley 61' including a pulley side 62 fixedly mounted thereon and a mating side 63 keyed to the shaft so that it is rotatable therewith but axially movable relative thereto. The side 63 is rotatably connected through ball bearing race 64 to annulus 65 which is axially movable with side 63. Screw 66 is threaded into a block 67 on the enclosure and is manually rotatable by a handle 68 disposed on the outer side of the enclosure for convenient access. The end of the screw engages the contact assembly 69 carried by the annulus 65. The shaft 50 has mounted thereon a pulley 70' having a pair of cooperating pulley sides 70 and 71, the side 71 being fixed on the shaft and the side 70 being keyed thereto for rotation therewith but for axial movement relative to side 71. The side 70 carries an annular retainer 72 surrounding the shaft and receiving a cup 73 secured to the shaft. A spring 74 within the retainer and cup is compressed between the base of the cup and the pulley side 70 to urge side 70 toward side 71. The cup is of course axially movable relative to the retainer.

A belt 75 is reeved over the pulleys 61' and 70' and the opposite edges of the belt are confined by the radially outwardly tapering sides of the mating pulley sides.

It will be apparent that if the screw 66 is turned in one direction to urge side 63 axially toward side 62, the belt is moved radially outwardly of the pulley and, since the belt is relatively inextensible, the portion of the belt over the other pulley 70' will assume a smaller radius. When the screw is rotated in the other direction, the sides 62 and 63 may move axially away from each other to decrease the radius of the belt on pulley 61' and to increase the radius of the belt on pulley 70' by the action of spring 74. In this way, the speed of the belt 30 is infinitely variable over a limited range, although the motor operates at constant speed.

It will be noted that the entire drive mechanism for the belt is located within the enclosure beneath the floor and completely out of sight.

In use, the rear door of the enclosure is swung down as shown in Figure 1, to enable an animal to be led into the enclosure. The rear panel is then latched in upright position and the rotation of the belt is started. In training an animal, such as a dog, to develop a desired gait, it is often necessary to start at low speeds and gradually work up to the speed for which the gait is intended. The variable drive feature of my exerciser is extremely well suited for this purpose since the belt may be started at a low speed to adapt the animal to the moving condition while at the same time training him to the proper gait. Then the speed may be gradually increased at an almost imperceptible rate so that the animal will increase his speed without changing gait. The animal may be led from the enclosure by swinging the front panel to the down position. Both the variable speed control handle 68 and motor on-off switch 80 are on the outer side of side wall 23 for convenient access.

The height of the enclosure walls above the floor may vary depending upon the animal to be trained, and preferably should be about shoulder high. The width of the enclosure from side wall to side wall should be sufficient to accommodate the animal comfortably, but narrow enough to prevent it from turning around.

The drawing and the foregoing specification constitute a description of the improved animal exerciser and trainer in such full, clear, concise and exact terms as to enable any person skilled in the art to practice the invention, the scope of which is indicated by the appended claims.

What I claim as my invention is:

1. An animal exerciser and trainer comprising an elongated enclosure having upright side and end walls, means for providing a floor within said enclosure below the upper edges of said side and end walls such that the upper edges of the side and end walls project above the floor to approximately shoulder height of an animal to be exercised and trained, an endless flexible linear member the top run of which constitutes a portion of said floor and is movable longitudinally of said enclosure, fixed floor members between the ends of the top run of said linear member and the end walls to complete the floor, drive means for said linear member, anti-friction support means for the top run of said linear member, the upper portions of said end walls constituting doors hinged at floor level for downward and outward swinging from upright position to provide ramps facilitating the movement of an animal to and from the enclosure, and releasable latch means for holding said doors in upright position, said enclosure being entirely open at the top and the ends thereof closed by said doors being entirely open and connecting directly with the open top of the enclosure when said doors are swung to the ramp-forming position aforesaid.

2. An animal exerciser and trainer as defined in claim 1 including means for preventing a foot of an animal from entering the space between said top run of said flexible linear member and said side walls including elongated continuous guard strips secured to said side walls and extending from end to end of said enclosure in overlying relation to the side edges of said top run in closely spaced relation thereabove and out of contact therewith.

3. An animal exerciser and trainer as defined in claim 1 in which said drive means is variable and is disposed within the confines of said enclosure and beneath said floor to be concealed thereby, and manually operable means for said variable drive means on the outer side of said enclosure.

4. An animal exerciser and trainer as defined in claim 3 in which said variable drive means comprises a base within said enclosure and beneath said floor, rolls supported on said base and extending transversely of the enclosure at opposite ends thereof, said linear member extending around said rolls in taut frictional engagement therewith, a drive motor on said base, and a variable speed transmission on said base interconnecting said motor and one of said rolls, said anti-friction support means for the top run of said linear member being supported on said base.

5. An animal exerciser and trainer as defined in claim 4 including means for preventing a foot of an animal from entering the space between said top run of said flexible linear member and said side walls including elongated continuous guard strips secured to said side walls and extending from end to end of said enclosure in overlying relation to the side edges of said top run in closely spaced relation thereabove and out of contact therewith.

References Cited in the file of this patent

UNITED STATES PATENTS

| 1,501,705 | Decoux | July 15, 1924 |
| 1,919,627 | FitzGerald | July 25, 1933 |
| 2,155,684 | Richards | Apr. 25, 1939 |

FOREIGN PATENTS

| 27,176 | Great Britain | 1908 |
| 384,019 | Great Britain | Dec. 2, 1933 |